United States Patent
Ballas et al.

[11] Patent Number: 5,737,378
[45] Date of Patent: Apr. 7, 1998

[54] REACTOR SHROUD JOINT

[75] Inventors: Gary J. Ballas; Alex Blair Fife; Israel Ganz, all of San Jose, Calif.

[73] Assignee: General Electric Company, Schenectady, N.Y.

[21] Appl. No.: 669,879

[22] Filed: Jun. 21, 1996

[51] Int. Cl.$^6$ ................................................ G21C 13/00
[52] U.S. Cl. ............................................... 376/287
[58] Field of Search .......................... 376/203, 205, 376/287, 289, 294–296; 220/327–328, 378

[56] References Cited

U.S. PATENT DOCUMENTS

| | | | |
|---|---|---|---|
| 2,982,713 | 5/1961 | Sankovich et al. | 376/397 |
| 3,016,463 | 1/1962 | Needham | 250/506.1 |
| 3,055,538 | 9/1962 | Schoessow | 220/327 |
| 3,121,046 | 2/1964 | Trickett et al. | 376/298 |
| 3,127,050 | 3/1964 | McDaniels, Jr. | 220/277 |
| 3,158,543 | 11/1964 | Sherman et al. | 376/148 |
| 3,192,120 | 6/1965 | Campbell | 376/362 |
| 3,275,521 | 9/1966 | Schluderberg et al. | 376/177 |
| 4,716,005 | 12/1987 | Ezekoye et al. | 376/205 |
| 4,818,476 | 4/1989 | Gasparro | 376/294 |
| 5,278,876 | 1/1994 | Sawabe | 376/205 |
| 5,519,744 | 5/1996 | Relf | 376/287 |
| 5,583,899 | 12/1996 | Relf | 376/287 |

*Primary Examiner*—Michael J. Carone
*Assistant Examiner*—Matthew J. Lattig
*Attorney, Agent, or Firm*—Armstrong, Teasdale, Schlafly & Davis

[57] ABSTRACT

A shroud for a nuclear reactor is described. In one embodiment, the shroud includes first and second shroud sections, and each shroud section includes a substantially cylindrical main body having a first end and a second end. With respect to each shroud section, a flange is located at the main body first end, and the flange has a plurality of bolt openings therein and a plurality of scalloped regions. The first shroud section is welded to the second shroud section, and at least some of the bolt openings in the first shroud section flange align with respective bolt openings in the second shroud section flange. In the event that the onset of inter-granular stress corrosion cracking is ever detected in the weld between the shroud sections, bolts are inserted through bolt openings in the first shroud section flange and through aligned bolt openings the second shroud section flange. Each bolt, in one embodiment, has a shank section and first and second threaded end sections. Nuts are threadedly engaged to the threaded end sections and tightened against the respective flanges.

17 Claims, 1 Drawing Sheet

REACTOR SHROUD JOINT

GOVERNMENT RIGHTS STATEMENT

The Government of the United States of America and the Advanced Reactor Corporation have rights in this invention pursuant to Contract No. DE-FC02-92NE34267 awarded by the U.S. Department of Energy.

FIELD OF THE INVENTION

This invention relates generally to nuclear reactors and, more particularly, to a nuclear reactor core shroud joint between adjacent cylindrical sections of a reactor shroud.

BACKGROUND OF THE INVENTION

A boiling water nuclear reactor typically includes a fuel core positioned within a cylindrical, stainless steel shroud. Specifically, the core center axis is substantially coaxial with the center axis of the shroud, and the shroud is open at both ends so that water can flow up through the lower end of the shroud and out through the upper end of the shroud. The shroud limits lateral movement of the core fuel bundles.

The shroud, due to its large size, is formed by welding a plurality of stainless steel cylindrical sections together. Specifically, respective ends of adjacent shroud sections are joined with a circumferential weld. The weld joint supports vertical and lateral loads associated with all modes of reactor operation.

The shroud welds, however, increase the susceptibility of the shroud material to a detrimental effect known as intergranular stress corrosion cracking (IGSCC). In the event that the onset of IGSCC is observed in a shroud weld, it would be desirable to quickly and easily provide an alternative mechanical support for the vertical and lateral loads initially supported by the shroud weld. In addition, it would be desirable for such mechanical support to have a sufficiently long life so that the reactor can realize it full design life. Further, such mechanical support should not interfere with inspection of the shroud weld during the life of the weld prior to detecting an onset of IGSCC, if any.

SUMMARY OF THE INVENTION

These and other objects are attained by a shroud for a nuclear reactor which, in one embodiment, includes first and second shroud sections, and each shroud section includes a substantially cylindrical main body, a first end and a second end. The first end of each shroud has a radius Rmc and the substantially cylindrical main body has a radius Rn. The radius Rmc is greater than the radius Rn.

With respect to each shroud section, a flange is located at the shroud section first end. The flange has a plurality of bolt openings therein and a plurality of scalloped regions. The flange of each shroud section is located at an interface between the main body and the first end, and the flange has an upper surface and a lower surface. The lower flange surface has a surface length B1 and the first shroud section upper flange surface has a surface length B2. The upper flange surface length B2 is greater than the lower flange surface B1. A lever arm distance E from a centerline of the wall of the section end to a nearest edge of a bolt opening in the flange is minimized to reduce a bending moment (M1) in the section end. Also, the end wall has a thickness C1 and the main body portion wall has a thickness C2. The wall thickness C2 is greater than the wall thickness C1.

The first end of the first shroud section is welded to the second shroud section, and at least some of the bolt openings in the first shroud section flange align with respective bolt openings in the second shroud section flange. A distance "A" between the first shroud section flange and the second shroud section flange enables inspection of the weld using well known equipment and techniques.

Over the course of the reactor life, and because the distance A between the first shroud section flange and the second shroud section flange enables inspection of the circumferential weld between the shroud sections, such weld can be easily inspected using well known equipment and techniques such as ultrasonic testing (UT).

In the event that the onset of IGSCC is ever detected in the weld, then the following operation is performed. Specifically, bolts are inserted through bolt openings in the first shroud section flange and through aligned bolt openings the second shroud section flange. Each bolt, in one embodiment, has a shank section and first and second threaded end sections. The shank section has a diameter D1 and each of the threaded end sections has a diameter D2. The diameter D1 is less than the diameter D2. Nuts are threadedly engaged to the threaded end sections and tightened against the respective flanges.

As described hereinafter in more detail, the above described shroud section construction and bolts minimize bending stresses in the shroud sections and satisfy required stress criteria. Further, the flanges do not interfere with existing hardware within the reactor. Such construction also is believed to have a sufficiently long life so that the reactor can realize it full design life.

DETAILED DESCRIPTION OF THE DRAWINGS

Figure 1A:
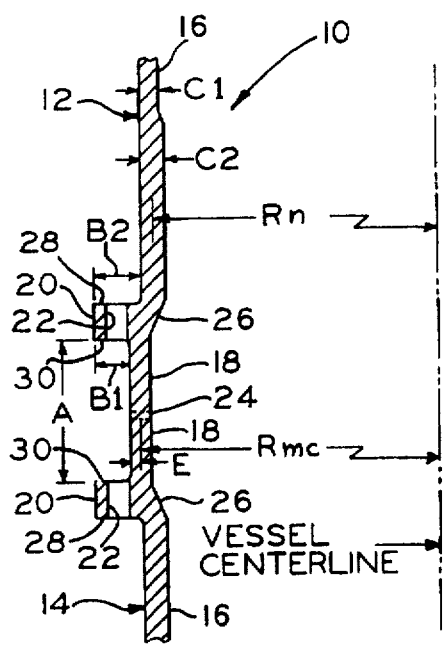
FIG. 1A is a cross section view of welded cylindrical sections of a shroud including bolt openings.

FIG. 1A is a cross section view of a shroud 10 including first and second cylindrical shroud sections 12 and 14. Each shroud section 12 and 14 includes a substantially cylindrical main body 16 having a first end 18 and a second end (not shown). The second end of each section 12 and 14, in one embodiment, is identical to first end 18. With respect to each shroud section 12 and 14, a flange 20 is located at first end 18, and flange 20 has a plurality of bolt openings 22 therein. First shroud section 12 is welded to second shroud section 14, and at least some bolt openings 22 in first shroud section flange 20 align with respective bolt openings 22 in second shroud section flange 20. A distance "A" between first shroud section flange 20 and second shroud section flange 20 enables inspection of weld 24 using well known equipment and techniques. First end 18 of each shroud section 12 and 14 has a radius Rmc and main body 16 has a radius Rn. Radius Rmc is greater than radius Rn.

Flange 20 is located at an interface 26 between main body 16 and end 18. Flange 20 has a first surface 28 and a second surface 30. Second flange surface 30 has a surface length B1 and first flange surface 28 has a surface length B2. First flange surface length B2 is greater than second flange surface length B1. A lever arm distance E from a centerline of the wall of end 18 to a nearest edge of bolt opening 22 is minimized to reduce a bending moment (M1) in end 18. Also, although the wall of main body 16 has a nominal thickness C1, close to end 18 the wall of main body 16 has a thickness C2. Wall thickness C2 is greater than wall thickness C1.

As explained above, first shroud section 12 is welded to second shroud section 14. Over the course of the reactor life, and because distance A between first shroud section flange 20 and second shroud section flange 20 enables inspection of circumferential weld 24 between shroud sections 12 and 14, weld 24 can be easily inspected using well known equipment and techniques.

Figure 1B:
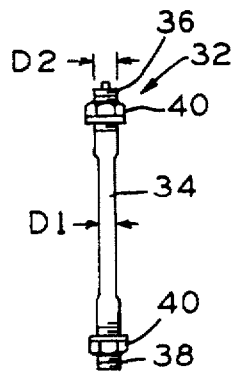
FIG. 1B is an elevated view of a bolt, in accordance with one embodiment of the present invention.

FIG. 1B is an elevated view of a bolt 32 constructed in accordance with one embodiment of the present invention. Specifically, bolt 32 has a shank section 34 and first and second threaded end sections 36 and 38. Shank section 34 has a diameter D1 and threaded end sections 36 and 38 have a diameter D2. Diameter D1 is less than diameter D2. Nuts 40 are shown as being threadedly engaged to threaded end sections 36 and 38.

In the event that the onset of IGSCC is ever detected in weld 24, then bolts 32 are inserted through bolt openings 22 in first shroud section flange 20 and through aligned bolt openings 22 in second shroud section flange 20. Nuts 40 are threadedly engaged to end sections 36 and 38 and then tightened against respective flanges 20.

Figure 2:
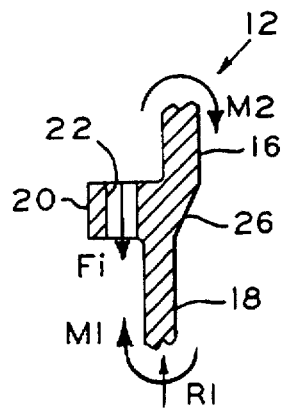
FIG. 2 is a cross section view through a portion of the shroud shown in FIG. 1.

FIG. 2 is a cross section view through a portion of shroud section 12 shown in FIG. 1A. Once bolts 32 are installed into openings 22 and tightened against flanges 20, a preload force Fi causes reaction force R1 and reaction bending moments M1 and M2 in shroud section 12. In order to minimize the bending stress in shroud section 12, bending moment M1 in end 18 is minimized by minimizing lever arm distance E (FIG. 1A). Since moment M1 is a function of preload force Fi and lever arm distance E, reduction in lever arm distance E minimizes bending moment M1 and bending stress in end 18. Minimization of distance E is limited by the required clearance between bolt 32 and shroud section 12.

In addition, and as explained above, radius Rmc is greater than radius Rn. Such increased radius Rmc creates offset 26, which is evident by greater surface length B2 in comparison to surface length B1 (FIG. 1A). Greater length B2 enables a larger washer to be used in connection with bolt 32 which results in preload force Fi to be distributed closer to the midplane of end 18. Also, since thickness C2 is greater than nominal shroud thickness C1, the shroud bending stress is minimized. Further, and with respect to bolt 32, since shank section 34 has diameter D1 which is less than diameter D2 of threaded sections 36 and 38, the bending stresses in threaded sections 36 and 38 are reduced due to the increased flexibility in shank section 34. This reduction in bending stress in threaded sections 36 and 38 improves the fatigue resistance of bolts 32 since a relatively high fatigue stress concentration factor is associated with bolt threads 36 and 38. In more general terms, such construction of bolt 32 redistributes the bending stresses to shank region 34 where the fatigue stress concentration factor is relatively low.

Figure 3:
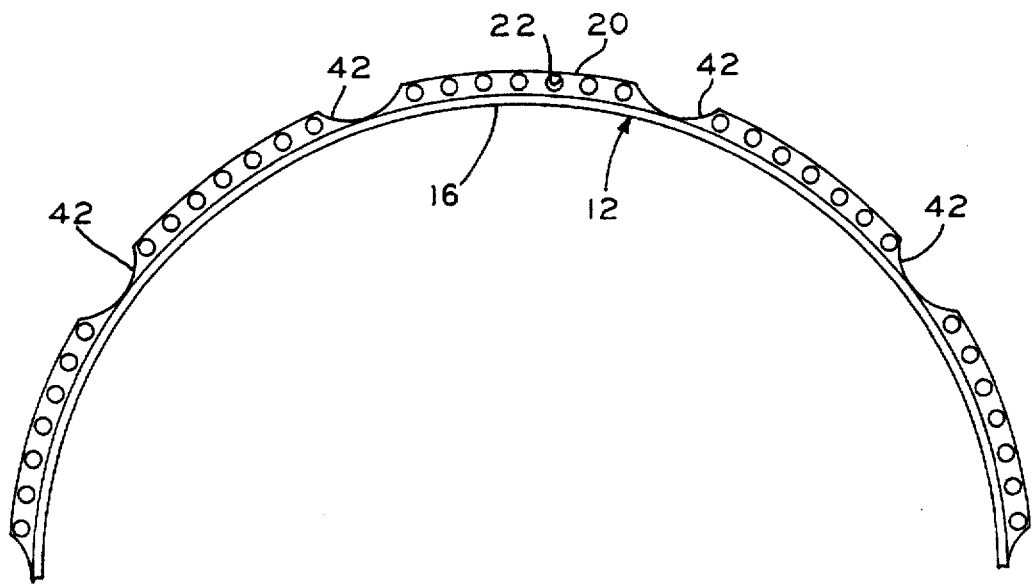
FIG. 3 is a top view of a section of the shroud flange shown in FIG. 1.

FIG. 3 is a top view of a 180° section of shroud section 12 shown in FIG. 1. In order to prevent flange 20 from interfering with existing reactor internal components, flange 20 includes scalloped regions 42.

Shroud sections 12 and 14 can be used in many different reactors including in the advanced boiling water nuclear reactor of General Electric Company. In addition, and more generally, the construction of shroud sections 12 and 14 can be used in any application in which two cylinders are joined in a similar fashion.

The above described shroud sections 12 and 14 and bolts 32 minimize bending stresses and satisfy required stress criteria. In addition, and prior to utilizing bolts 32, such construction allows weld 24 to be inspected using known techniques, such as ultrasonic testing (UT). Further, flanges 20 do not interfere with existing hardware within the reactor. Such construction also is believed to have a sufficiently long life so that the reactor can realize it full design life.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A shroud section for being located within a reactor pressure vessel of a nuclear reactor, said shroud section comprising:

a substantially cylindrical main body having an outer diameter less than an inner diameter of the reactor pressure vessel and comprising a first end and a second end; and a flange located at said main body first end, said flange having a plurality of bolt openings therein and comprising a plurality of scalloped regions therein.

2. A shroud section in accordance with claim 1 wherein said main body further comprises a center body portion, said main body first end having a radius Rmc measured from the vessel centerline to the center of the wall of said main body first end and said center body portion having a radius Rn measured from the vessel centerline to the center of the wall of said center body portion, said radius Rmc greater than said radius Rn.

3. A shroud section in accordance with claim 2 wherein said flange is located at an interface between said center body portion and said first end, said flange having a first surface and a second surface, said second flange surface having a surface length B1 and said first flange surface having a surface length B2, said first flange surface length B2 being greater than said second flange surface length B1.

4. A shroud section in accordance with claim 1 wherein a portion of said main body has a wall thickness C1 and another portion of said main body has a wall thickness C2, said wall thickness C2 greater than said wall thickness C1.

5. A shroud for being located within a reactor pressure vessel of a nuclear reactor for limiting lateral movement of fuel bundles, said shroud comprising:

a first shroud section comprising a substantially cylindrical main body having an outer diameter less than an inner diameter of the reactor pressure vessel and comprising a first end and a second end, and a flange located at said main body first end, said flange having a plurality of bolt openings therein; and a second shroud section comprising a substantially cylindrical main body having an outer diameter less than an inner diameter of the reactor pressure vessel and comprising a first end and a second end, and a flange located at said main body first end, said flange having a plurality of bolt openings therein.

6. A shroud in accordance with claim 5 wherein said first shroud section flange comprises a plurality of scalloped regions therein.

7. A shroud in accordance with claim 5 wherein said first shroud section main body further comprises a center body portion, said first shroud section main body first end having a radius Rmc measured from the vessel centerline to the center of the wall of said main body first end and said first shroud section center body portion having a radius Rn measured from the vessel centerline to the center of the wall of said center body portion, said radius Rmc greater than said radius Rn.

8. A shroud in accordance with claim 7 wherein said first shroud section flange is located at an interface between said center body portion and said first end, said first shroud section flange having a first surface and a second surface, said second surface of said first shroud section flange having a surface length B1 and said first surface of said first shroud section flange having a surface length B2, said surface length B2 greater than said surface length B1.

9. A shroud in accordance with claim 5 wherein a portion of said first shroud section main body has a wall thickness C1 and another portion of said first shroud section main body has a wall thickness C2, said wall thickness C2 greater than said wall thickness C1.

10. A shroud in accordance with claim 5 wherein said second shroud section flange comprises a plurality of scalloped regions, said second shroud section main body further comprising a center body portion, said second shroud section first end having a radius Rmc measured from the vessel centerline to the center of the wall of said main body first end and said second shroud section center body portion having a radius Rn measured from the vessel centerline to the center of the wall of said center body portion, said radius Rmc greater than said radius Rn, said second shroud section flange located at an interface between said center body portion and said first end, said second shroud section flange having a first surface and a second surface, said second surface of said second shroud section flange having a surface length B1 and said first surface of said second shroud section flange having a surface length B2, said surface length B2 greater than said surface length B1, a portion of said second shroud section main body having a wall thickness C1 and another portion of said second shroud section main body having a wall thickness C2, said wall thickness C2 greater than said wall thickness C1.

11. A shroud in accordance with claim 5 wherein at least some of said bolt openings in said first shroud section flange align with respective bolt openings in said second shroud section flange.

12. A shroud in accordance with claim 5 wherein said first shroud section is welded to said second shroud section, and a distance A between said first shroud section flange and said second shroud section flange enables inspection of said weld.

13. A shroud in accordance with claim 5 wherein a lever arm distance E from a centerline of an end portion wall of said first shroud section main body adjacent said first shroud section main body first end to a nearest edge of at least one of said bolt openings in said first shroud section flange is selected to reduce a bending moment (M1) in said first shroud section main body end portion.

14. A shroud in accordance with claim 5 further comprising a bolt extending through a bolt opening in first shroud section flange and a bolt opening in said second shroud section flange, said bolt comprising a shank section and threaded end sections.

15. A shroud in accordance with claim 14 wherein said shank section has a diameter D1 and each of said threaded end sections has a diameter D2, said diameter D1 being less than said diameter D2.

16. A method for securing a first shroud section to a second shroud section of a shroud located within a reactor pressure vessel of a nuclear reactor to limit lateral movement of fuel bundles, the first and second shroud sections each including a substantially cylindrical main body having a first end and a second end, and a flange located at the main body first end, the flange having a plurality of bolt openings therein, the first shroud section welded to the second shroud section, said method comprising the steps of:

inserting a bolt through a first bolt opening in the first shroud section flange and through a first bolt opening the second shroud section flange, the bolt having a shank section and first and second threaded end sections; and engaging a first nut to the first threaded end section of the bolt and against the flange of the first shroud section.

17. A method in accordance with claim 16 further comprising the step of engaging a second nut to the second threaded end section of the bolt and against the flange of the second shroud section.

* * * * *